(12) United States Patent
Okuyama

(10) Patent No.: US 10,784,531 B2
(45) Date of Patent: Sep. 22, 2020

(54) COMPOSITE BODY HAVING LITHIUM COMPOSITE METAL OXIDE WITH COBALT ON SURFACE, LITHIUM BATTERY, AND ELECTRONIC APPARATUS

(71) Applicant: SEIKO EPSON CORPORATION, Tokyo (JP)

(72) Inventor: Tomoyuki Okuyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 123 days.

(21) Appl. No.: 16/050,759

(22) Filed: Jul. 31, 2018

(65) Prior Publication Data

US 2019/0058212 A1 Feb. 21, 2019

(30) Foreign Application Priority Data

Aug. 17, 2017 (JP) ................. 2017-157436

(51) Int. Cl.
| | |
|---|---|
| *H01M 10/0525* | (2010.01) |
| *H01M 4/64* | (2006.01) |
| *H01M 10/04* | (2006.01) |
| *H01M 4/36* | (2006.01) |
| *H01M 4/525* | (2010.01) |
| *H01M 10/0562* | (2010.01) |
| *H01M 4/38* | (2006.01) |
| *H01M 4/02* | (2006.01) |

(52) U.S. Cl.
CPC ....... *H01M 10/0525* (2013.01); *H01M 4/364* (2013.01); *H01M 4/381* (2013.01); *H01M 4/382* (2013.01); *H01M 4/525* (2013.01); *H01M 4/64* (2013.01); *H01M 10/0431* (2013.01); *H01M 10/0562* (2013.01); *H01M 2004/028* (2013.01); *H01M 2300/0071* (2013.01)

(58) Field of Classification Search
CPC ...... H01M 4/364; H01M 4/381; H01M 4/382; H01M 4/525; H01M 4/64; H01M 10/0525; H01M 10/0431; H01M 10/0562
USPC .................................................. 429/231.95
See application file for complete search history.

(56) References Cited

U.S. PATENT DOCUMENTS

| | | | | |
|---|---|---|---|---|
| 2005/0019661 | A1* | 1/2005 | Han | C01G 45/006 429/231.95 |
| 2016/0336594 | A1* | 11/2016 | Ahn | H01M 4/505 |
| 2016/0359190 | A1 | 12/2016 | Teraoka et al. | |
| 2017/0179484 | A1* | 6/2017 | Park | H01M 10/0569 |

FOREIGN PATENT DOCUMENTS

| | | | |
|---|---|---|---|
| JP | 2008251520 A | * | 10/2008 |
| JP | 2016-091626 A | | 5/2016 |
| JP | 2017-004672 A | | 1/2017 |

* cited by examiner

*Primary Examiner* — Sean P Cullen
(74) *Attorney, Agent, or Firm* — Oliff PLC

(57) ABSTRACT

A composite body includes a positive electrode active material composed of a lithium composite metal oxide containing Li and at least one type of transition metal, and an electrolyte, wherein the positive electrode active material is present on one surface of the composite body, the one type of transition metal is Co, and the molar ratio of Co (cobalt) in the positive electrode active material (lithium cobalt oxide) present on the one surface is equal to or more than the molar ratio of O (oxygen).

15 Claims, 10 Drawing Sheets

COMPOSITE BODY HAVING LITHIUM COMPOSITE METAL OXIDE WITH COBALT ON SURFACE, LITHIUM BATTERY, AND ELECTRONIC APPARATUS

BACKGROUND

1. Technical Field

The present invention relates to a composite body, a lithium battery using the composite body, and an electronic apparatus.

2. Related Art

As a lithium battery, for example, JP-A-2016-91626 (Patent Document 1) discloses a lithium-ion secondary battery using a positive electrode active material containing Li, Ni, Co, Mn, and W as a positive electrode. In the positive electrode active material of Patent Document 1, W (tungsten) is unevenly distributed and exists more in the surface layer than inside the positive electrode active material, and it says that a W-containing crystalline compound is not contained. According to one example of a method for producing a positive electrode active material described in Patent Document 1, a hydroxide containing Ni, Co, and Mn at predetermined molar ratios, respectively, and a lithium compound are mixed, and the resulting first mixture is calcined. Then, the resulting calcined material and an aqueous solution of a tungsten compound are mixed, and the resulting second mixture is fired, whereby the positive electrode active material is produced. It says that if such a positive electrode active material is used as a positive electrode, an insertion/desorption reaction of Li is accelerated in the surface layer of the positive electrode active material, and further, aside reaction between the positive electrode active material and an electrolyte solution is suppressed, and thus, a lithium-ion secondary battery having excellent output characteristics and charge and discharge cycle characteristics can be provided.

Further, for example, JP-A-2017-4672 (Patent Document 2) discloses a lithium battery including an electrode assembly having an active material molded body, a first solid electrolyte layer, and a second solid electrolyte layer, a current collector provided so as to come into contact with the active material molded body on one surface of the electrode assembly, and an electrode provided so as to come into contact with the first solid electrolyte layer or the second solid electrolyte layer on the other surface of the electrode assembly. According to one example of a method for producing an electrode assembly described in Patent Document 2, a solution of a first inorganic solid electrolyte is impregnated into a porous active material molded body having communication holes therein, followed by heating, whereby the first solid electrolyte layer composed of the first inorganic solid electrolyte is formed inside the communication holes and on the surface of the active material molded body. Further, a molten material obtained by melting a solid material of a second inorganic solid electrolyte containing boron is impregnated into the active material molded body, whereby the second solid electrolyte layer composed of the second inorganic solid electrolyte is formed inside the communication holes and on the surface of the active material molded body. It says that since the communication holes of the active material molded body are filled with the first solid electrolyte layer and the second solid electrolyte layer, the electrical interface is increased, and thus, the mobility of electrical charges (lithium ions or electrons) is improved. By using such an electrode assembly, a lithium battery having excellent charge and discharge characteristics can be provided.

However, in the above-mentioned Patent Document 1, the insertion/desorption reaction of Li is accelerated in the surface layer of the positive electrode active material, and further, in order to suppress the side reaction between the positive electrode active material and the electrolyte solution, a forming process for unevenly distributing Win the surface layer of the positive electrode active material containing W is needed. That is, it had a problem that the structure of the positive electrode active material and the production method therefor are complicated.

Further, in the method for producing an electrode assembly of the above-mentioned Patent Document 2, after the active material molded body is exposed by grinding or polishing one surface of the electrode assembly on which the first solid electrolyte layer or the second solid electrolyte layer is formed, the current collector is bonded to the one surface, whereby the active material molded body and the current collector are brought into contact with each other. Therefore, it was difficult to further reduce the contact resistance between the active material molded body and the current collector. That is, it had a problem that there was still room for improvement of the charge and discharge characteristics by further reducing the internal resistance of the lithium battery.

SUMMARY

An advantage of some aspects of the invention is to solve at least a part of the problems described above and the invention can be implemented as the following forms or application examples.

APPLICATION EXAMPLE

A composite body according to an application example is a composite body including a positive electrode active material composed of a lithium composite metal oxide containing Li and at least one type of transition metal, and an electrolyte, wherein the positive electrode active material is exposed on one surface of the composite body, the one type of transition metal is Co (cobalt), and the molar ratios of Co and O (oxygen) in the positive electrode active material exposed on the one surface satisfy the following relationship: Co≥O.

According to this application example, a case where the molar ratios of Co and oxygen (O) in the positive electrode active material exposed on one surface of the composite body satisfy the following relationship: Co≥O indicates that Co which is a transition metal in a non-oxidized state exists more. In other words, this indicates that the transition metal of the positive electrode material exposed on one surface of the composite body is reduced. Therefore, when a current collector is formed on the one surface, the current collector and the reduced transition metal come into contact with each other, so that the internal resistance of a lithium battery can be reduced. That is, a composite body capable of reducing the internal resistance without the need of adding a new element for reducing the internal resistance of a lithium battery in the positive electrode active material can be provided.

In the composite body according to the application example, X-ray diffraction peaks derived from Co are obtained when 2θ may be in the following ranges: 43°<2θ<45° and 47°<2θ<48° in X-ray diffractometry of the one surface.

According to this configuration, this indicates that Co as a non-oxidized transition metal exists on the one surface of the composite body.

In the composite body according to the application example, a relationship between the intensity of a peak R1 derived from Co or Co oxides appearing in the range of 510 $cm^{-1}$ to 530 $cm^{-1}$ and the intensity of a peak R2 of lithium cobalt oxide appearing in the range of 590 $cm^{-1}$ to 610 $cm^{-1}$ in Raman spectroscopy of the one surface may be as follows: R1≥R2.

According to this configuration, this indicates that on the one surface of the composite body, the number of non-oxidized Co atoms is larger than the number of Co atoms constituting lithium cobalt oxide which is the positive electrode active material. That is, a composite body in which a large number of non-oxidized Co atoms which contribute to the reduction of the internal resistance of a lithium battery exist on the one surface can be provided.

In the composite body according to the application example, it is preferred that the positive electrode active material has a particulate shape and forms a structure having voids inside, and the electrolyte includes a first electrolyte and a second electrolyte having a melting point lower than that of the first electrolyte, each of which is filled in the voids.

According to this configuration, a contact area between the positive electrode active material and the electrolyte is increased, and a composite body capable of realizing excellent charge and discharge characteristics when it is used in a battery can be provided.

In the composite body according to the application example, it is preferred that the second electrolyte is a lithium composite oxide containing C (carbon) and B (boron).

According to this configuration, a lithium composite oxide containing C (carbon) and B (boron) is likely to become amorphous, and therefore, as compared with the case where the second electrolyte is crystalline, an excellent ion conduction property of the composite body can be realized.

In the composite body according to the application example, it is preferred that the positive electrode active material contains at least one type of metal selected from alkali metals and alkaline earth metals.

According to this configuration, as compared with the case where an alkali metal or an alkaline earth metal is not contained, an excellent ion conduction property of the composite body can be realized.

Application Example

A lithium battery according to an application example includes the composite body according to the application example, a current collector provided on one surface side of the composite body, and a negative electrode layer provided on the other surface side of the composite body.

According to this application example, the electrical resistance at the connection between the composite body and the current collector can be reduced, and therefore, a lithium battery having a low internal resistance and excellent charge and discharge characteristics can be provided.

Application Example

A method for producing a composite body according to an application example includes forming a structure having voids therein using a positive electrode active material composed of a lithium composite metal oxide containing Li and at least one type of transition metal, filling an electrolyte in the voids of the structure, exposing the positive electrode active material on a polished surface by polishing one surface of the structure in which the electrolyte is filled, and reducing the exposed positive electrode active material by subjecting the structure to a heating treatment in an inert gas atmosphere in which a reducing agent is placed.

According to this application example, the oxidized transition metal contained in the exposed positive electrode active material is reduced and exposed on the one surface. Therefore, by forming a current collector on the one surface, the current collector and the reduced transition metal come into contact with each other, and thus, a composite body capable of reducing the internal resistance of a lithium battery can be produced. Further, the transition metal for reducing the resistance at the electrical connection between the positive electrode active material and the current collector can be easily made to exist on the one surface.

In the method for producing a composite body according to the application example, it is preferred that the filling of an electrolyte includes depositing a first electrolyte on the inner surfaces of the voids by filling a precursor solution of the first electrolyte in the voids, followed by heating, bringing a melt obtained by melting a second electrolyte having a melting point lower than that of the first electrolyte into contact with one surface of the structure in which the first electrolyte is deposited, thereby filling the melt of the second electrolyte in the voids, and solidifying the filled melt of the second electrolyte.

According to this method, the first electrolyte and the second electrolyte are filled in the voids of the structure of the positive electrode active material, and therefore, a contact area between the positive electrode active material and the first electrolyte and the second electrolyte is increased, and a composite body having an excellent ion conduction property can be produced.

In the method for producing a composite body according to the application example, the transition metal may be selected from Ti, V, Cr, Mn, Fe, Co, Ni, and Cu.

According to this method, a composite body can be produced by selecting a transition metal which is more easily reduced than Li.

In the method for producing a composite body according to the application example, the one type of transition metal may be Co.

According to this method, a composite body can be produced by selecting Co as a transition metal which is more easily reduced than Li.

Application Example

A method for producing a lithium battery according to an application example includes forming a current collector on the one surface side of a composite body obtained by the method for producing a composite body according to the application example, and forming a negative electrode layer on the other surface side of the composite body.

According to this application example, the electrical resistance at the connection between the composite body and the current collector can be reduced, and therefore, a lithium battery having a low internal resistance and excellent charge and discharge characteristics can be produced.

In the method for producing a lithium battery according to the application example, the method may include forming an electrolyte layer on the other surface of the composite body, and in the forming of the negative electrode layer, the negative electrode layer composed of metal Li is formed on the electrolyte layer.

According to this method, by using metal Li as the negative electrode layer, a higher discharge capacity can be realized as compared with the case where other electrode materials are used. Further, by forming the electrolyte layer between the structure and the negative electrode layer composed of metal Li, an electrical short circuit associated with the formation of a metal Li dendrite during charge and discharge can be prevented by the electrolyte layer.

Application Example

An electronic apparatus according to an application example includes the lithium battery according to the application example.

According to this application example, by including the lithium battery having excellent charge and discharge characteristics, for example, a portable electronic apparatus which is capable of charging the battery in a short time, and can be used over a long period of time can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments embodying the invention will be described with reference to the drawings. The drawings to be used are displayed by being appropriately enlarged or reduced in size so that portions to be described are in a recognizable state.

First Embodiment

Lithium Battery

Figure 1:
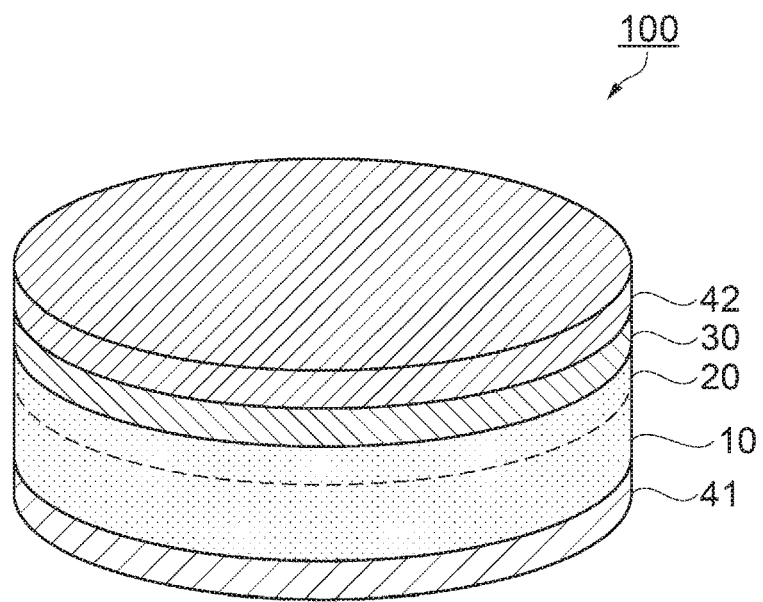
FIG. 1 is a schematic perspective view showing a structure of a lithium battery of a first embodiment.

One example of a lithium battery using a composite body of this embodiment will be described with reference to FIGS. 1 to 3. FIG. 1 is a schematic perspective view showing a structure of a lithium battery of a first embodiment, FIG. 2 is a schematic cross-sectional view showing a structure of the lithium battery of the first embodiment, and FIG. 3 is an enlarged view showing a positive electrode active material, a first electrolyte, and a second electrolyte in a composite body of the first embodiment.

As shown in FIG. 1, a lithium battery 100 as a battery of this embodiment includes a composite body 10 which functions as a positive electrode layer, and an electrolyte layer 20 and a negative electrode layer 30 stacked in this order on the composite body 10. Further, the lithium battery 100 includes a current collector 41 which is in contact with the composite body 10, and a current collector 42 which is in contact with the negative electrode layer 30. The composite body 10, the electrolyte layer 20, and the negative electrode layer 30 are all constituted by a solid phase containing lithium, and therefore, the lithium battery 100 is an all-solid-state secondary battery which can be charged and discharged.

The lithium battery 100 of this embodiment has, for example, a circular disk shape, and the size of the outer shape is, for example, 10 mm Φ and the thickness is, for example, about 0.3 mm. The lithium battery 100 is small and thin, and also can be charged and discharged, and is an all-solid-state battery, and therefore can be preferably used as a power supply for a portable information terminal such as a smartphone. The size or the thickness of the lithium battery 100 are not limited thereto if molding is possible. As for the thickness in the case where the size of the outer shape is 10 mm Φ as in this embodiment, the thickness is about 0.1 mm from the viewpoint of moldability when the battery is thin, and the thickness is up to about 1 mm which is estimated from the viewpoint of lithium conduction property of the electrolyte when the battery is thick, and if the battery is too thick, the utilization efficiency of the active material is deteriorated. The shape of the lithium battery 100 is not limited to a circular disk shape, and may be a polygonal disk shape. Hereinafter, the respective layers will be described in detail.

Figure 2:
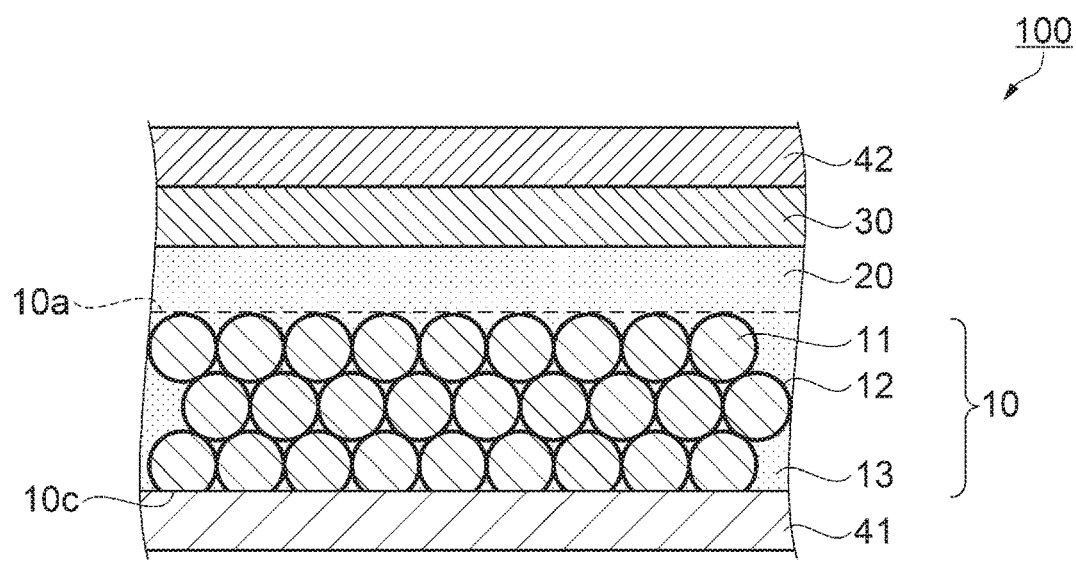
FIG. 2 is a schematic cross-sectional view showing a structure of the lithium battery of the first embodiment.
Figure 3:
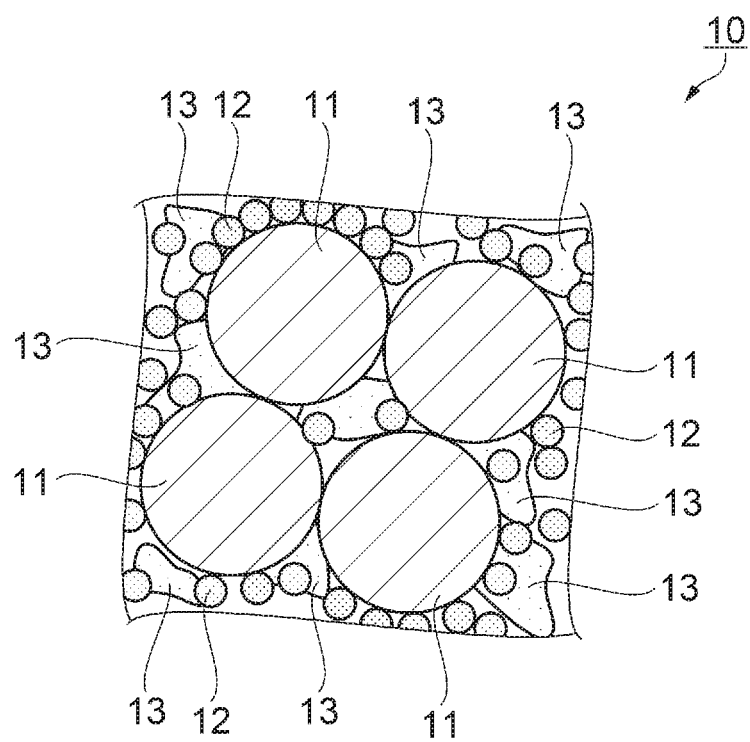
FIG. 3 is an enlarged view showing a positive electrode active material, a first electrolyte, and a second electrolyte in a composite body of the first embodiment.

As shown in FIG. 2, the composite body 10 includes a positive electrode active material 11, a first electrolyte 12, and a second electrolyte 13. The positive electrode active material 11 has a particulate shape, and by the contact of the positive electrode active materials 11 in the composite body 10, the composite body 10 is in a state where an electron conduction property is imparted thereto. The current collector 41 is provided in contact with a plurality of positive electrode active materials 11.

The electrolyte layer 20 provided between the composite body 10 and the negative electrode layer 30 is configured to include an electrolyte without including the positive electrode active material 11. In other words, a configuration in which conduction of electrical charges (lithium ions or electrons) is performed between the composite body 10 and the negative electrode layer 30 without causing an electrical short circuit between the composite body 10 to which an electron conduction property is imparted and the negative electrode layer 30 by interposing the electrolyte layer 20 therebetween is adopted.

Hereinafter, a description will be given by referring to a surface of the composite body 10 to come into contact with the current collector 41 on the positive electrode side as "one surface 10c" and a surface of the composite body 10 to come into contact with the electrolyte layer 20 as "the other surface 10a" in the lithium battery 100 of this embodiment.

Composite Body

As shown in FIG. 3, each of the positive electrode active material 11 and the first electrolyte 12 in the composite body 10 has a particulate shape, and the particle diameter of the first electrolyte 12 is extremely smaller than the particle diameter of the positive electrode active material 11. The first electrolyte 12 exists between the positive electrode active materials 11 in contact with the surfaces of the positive electrode active materials 11 having a particulate shape. Further, the second electrolyte 13 exists so as to fill the gap between the particles of the positive electrode active material 11. In this embodiment, the positive electrode active material 11 and the first electrolyte 12 are crystalline, and on the other hand, the second electrolyte 13 is amorphous. In FIG. 3, the particulate shape of each of the positive electrode active material 11 and the first electrolyte 12 is a spherical shape, however, the actual particulate shape is not necessarily a spherical shape, but is an indefinite shape.

From the viewpoint that an electron conduction property is exhibited by bringing the particles of the positive electrode active material 11 into contact with one another, as the particle diameter of the positive electrode active material 11, for example, the median diameter d50 thereof is preferably set to 500 nm or more and less than 10 µm. On the other hand, as the particle diameter of the first electrolyte 12, for example, the median diameter d50 thereof is at a submicron level. In FIG. 3, the particles of the first electrolyte 12 are illustrated in a recognizable state, however, in fact, fine particles at a submicron level come into contact with one another and form the first electrolyte 12.

As the positive electrode active material 11 included in the composite body 10, a lithium composite metal oxide containing Li and at least one type of transition metal selected from Ti, V, Cr, Mn, Fe, Co, Ni, and Cu as the constituent elements is preferably used because it is chemically stable. Examples of such a lithium composite metal oxide include $LiCoO_2$, $LiNiO_2$, $LiMn_2O_4$, $Li_2Mn_2O_3$, $Li(Ni_xMn_yCo_{1-x-y})O_2$ [$0<x+y<1$], $Li(Ni_xCo_yAl_{1-x-y})O_2$ [$0<x+y<1$], $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, $Li_2MnSiO_4$, and $Li_2TiO_3$. Further, solid solutions in which the atoms in a crystal of any of these lithium composite metal oxides are partially substituted with a typical metal, an alkali metal, an alkaline earth metal, a lanthanoid, a chalcogenide, a halogen, or the like are also included in the lithium composite metal oxide, and any of these solid solutions can also be used as the positive electrode active material.

Electrolyte

As each of the first electrolyte 12 and the second electrolyte 13 contained in the composite body 10, and the electrolyte layer 20, a crystalline or amorphous material which is a solid electrolyte and is composed of an oxide, a sulfide, a halide, a nitride, a hydride, a boride, or the like can be used.

Example of the oxide crystalline material include $Li_{0.35}La_{0.55}TiO_3$, $Li_{0.2}La_{0.27}NbO_3$, and a perovskite-type crystal or a perovskite-like crystal in which the elements in a crystal thereof are partially substituted with N, F, Al, Sr, Sc, Ta, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements in a crystal thereof are partially substituted with N, F, Al, Sr, Sc, Ta, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements in a crystal thereof are partially substituted with N, F, Al, Sr, Sc, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.6}V_{0.4}Ge_{0.6}O_4$, and $Li_{2+x}C_{1-x}B_xO_3$.

Example of the sulfide crystalline material include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous materials include $Li_3BO_3$, $Li_3BO_3-Li_4SiO_4$, $Li_3BO_3-Li_3PO_4$, $Li_3BO_3-Li_2SO_4$, $Li_2CO_3-Li_3BO_3$, $Li_2O-TiO_2$, $La_2O_3-Li_2O-TiO_2$, $LiNbO_3$, $LiSO_4$, $Li_4SiO_4$, $Li_3PO_4-Li_4SiO_4$, $Li_4GeO_4-Li_3VO_4$, $Li_4SiO_4-Li_3VO_4$, $Li_4GeO_4-Zn_2GeO_2$, $Li_4SiO_4-LiMoO_4$, $Li_3PO_4-Li_4SiO_4$, $Li_4SiO_4-Li_4ZrO_4$, $SiO_2-P_2O_5-Li_2O$, $SiO_2-P_2O_5-LiCl$, $Li_2O-LiCl-B_2O_3$, $LiI$, $LiI-CaI_2$, $LiI-CaO$, $LiAlCl_4$, $LiAlF_4$, $LiF-Al_2O_3$, $LiBr-Al_2O_3$, $LiI-Al_2O_3$, $Li_{2.88}PO_{3.73}N_{0.14}$, $Li_3NI_2$, $Li_3N-LiI-LiOH$, $Li_3N-LiCl$, $Li_6NBr_3$, $Li_2S-SiS_2$, $Li_2S-SiS_2-LiI$, and $Li_2S-SiS_2-P_2S_5$.

As a method for forming the electrolyte layer 20 using the above-mentioned solid electrolyte, other than a solution process such as a so-called sol-gel method accompanying a hydrolysis reaction of an organometallic compound or the like or an organometallic thermal decomposition method, any method such as a CVD method using an appropriate metal compound in an appropriate gas atmosphere, an ALD method, a green sheet method or a screen printing method using a slurry of solid electrolyte particles, an aerosol deposition method, a sputtering method using an appropriate target and an appropriate gas atmosphere, a PLD method, or a flux method using a melt or a solution may be used.

In this embodiment, the same solid electrolyte is used for the second electrolyte 13 contained in the composite body 10 and the electrolyte layer 20, however, different solid electrolytes may be used.

In the composite body 10 of this embodiment, the positive electrode active material 11 is exposed on the one surface 10c to come into contact with the current collector 41, and the above-mentioned transition metal contained in the exposed positive electrode active material 11 is reduced. That is, the transition metal contained in the positive electrode active material 11 is partially exposed on the one surface 10c of the composite body 10 in a non-oxidized state. Therefore, the plurality of positive electrode active materials 11 and the current collector 41 are formed so as to be electrically connected to each other through the non-oxidized transition metal. A method for producing the composite body 10 including such a positive electrode active material 11 will be described later.

Negative Electrode Layer

As a negative electrode active material contained in the negative electrode layer 30, for example, $Nb_2O_5$, $V_2O_5$, $Ti_2O_2$, $In_2O_5$, $ZnO$, $SnO_2$, $NiO$, $ITO$ (Sn-doped indium oxide), $AZO$ (aluminum-doped zinc oxide), $GZO$ (gallium-doped zinc oxide), $ATO$ (antimony-doped tin oxide), $FTO$ (fluorine-doped tin oxide), an anatase phase of $TiO_2$, a lithium composite metal oxide containing Ti such as $Li_4Ti_5O_{12}$ or $Li_2Ti_3O_7$, a metal or an alloy such as Li, Si, Sn, Si—Mn, Si—Co, Si—Ni, In, or Au, a carbon material, a material obtained by intercalation of lithium ions between layers of a carbon material, or the like can be used.

As a method for forming the negative electrode layer using the above-mentioned negative electrode active material, other than a solution process such as a so-called sol-gel method accompanying a hydrolysis reaction of an organometallic compound or the like or an organometallic thermal decomposition method, any method such as a CVD method using an appropriate metal compound in an appropriate gas atmosphere, an ALD method, a green sheet method or a screen printing method using a slurry of a solid negative electrode active material, an aerosol deposition method, a sputtering method using an appropriate target and an appropriate gas atmosphere, a PLD method, a vacuum deposition method, a plating method, or a thermal spraying method may be used.

Current Collector

As the current collectors 41 and 42, for example, one type of metal (metal simple substance) selected from the metal group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy composed of two or more types of metals selected from this metal group, or the like is used.

In this embodiment, as the current collectors 41 and 42, copper (Cu) is used. The thickness of each of the current collectors 41 and 42 is, for example, from 20 μm to 40 μm. The lithium battery 100 is not necessarily provided with a pair of current collectors 41 and 42 and may be provided with one of the current collectors 41 and 42. For example, in the case where a plurality of lithium batteries 100 are stacked so as to be electrically connected in series and used, a configuration in which only the current collector 41 is provided may be adopted.

Method for Producing Lithium Battery (Method for Producing Composite Body)

Figure 4:
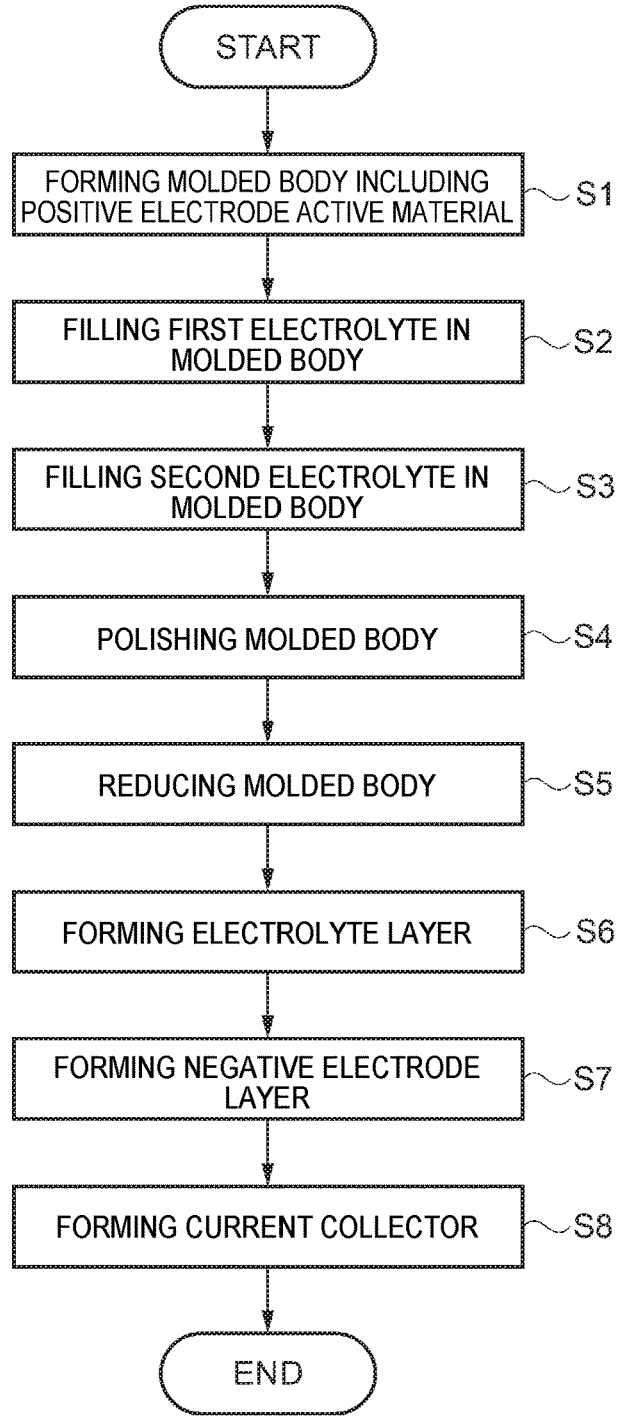
FIG. 4 is a flowchart showing a method for producing the lithium battery of the first embodiment.
Figure 6:
FIG. 6 is a schematic view showing a step in the method for producing the lithium battery of the first embodiment.
Figure 7:
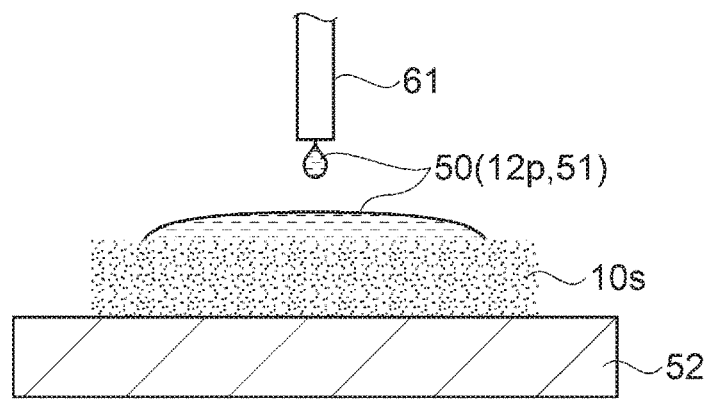
FIG. 7 is a schematic view showing a step in the method for producing the lithium battery of the first embodiment.
Figure 8:
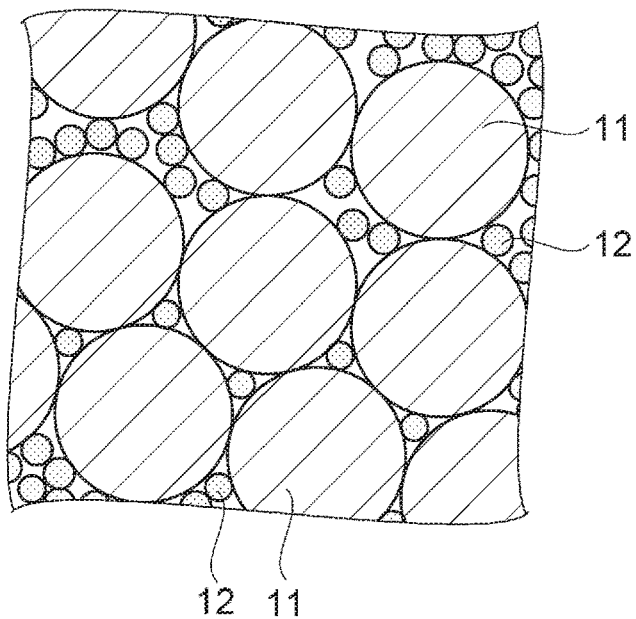
FIG. 8 is an enlarged view showing an internal structure of a structure including a positive electrode active material of the first embodiment.

A method for producing the lithium battery 100 including a method for producing the composite body 10 of this embodiment will be described with reference to FIGS. 4 to 13. FIG. 4 is a flowchart showing the method for producing the lithium battery of the first embodiment, FIGS. 5 to 7 and 9 to 13 are each a schematic view showing a step in the method for producing the lithium battery of the first embodiment. FIG. 8 is an enlarged view showing the internal structure of a structure including the positive electrode active material of the first embodiment.

As shown in FIG. 4, the method for producing the lithium battery 100 of this embodiment includes a step of forming a molded body including a positive electrode active material 11 (step S1), a step of filling a first electrolyte in the molded body (step S2), a step of filling a second electrolyte in the molded body (step S3), a step of polishing the molded body (step S4), a step of reducing the molded body (step S5), a step of forming an electrolyte layer 20 (step S6), a step of forming a negative electrode layer 30 (step S7), and a step of forming current collectors 41 and 42 (step S8). The above-mentioned step S1 to step S5 correspond to the method for producing the composite body 10 of this embodiment.

Figure 5:
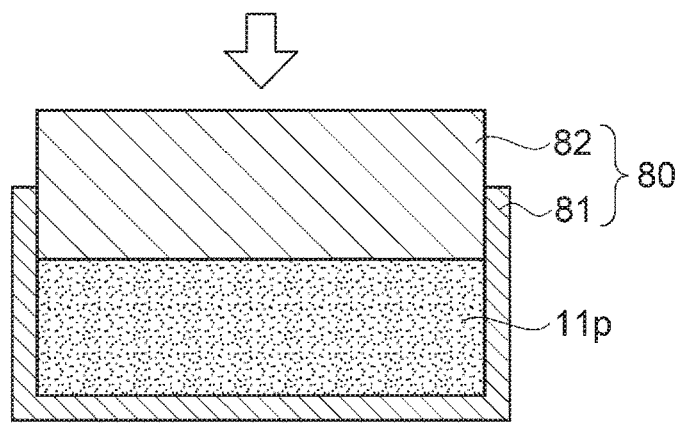
FIG. 5 is a schematic view showing a step in the method for producing the lithium battery of the first embodiment.

In the step of forming a molded body including a positive electrode active material 11 of the step S1, a molded body as a structure having voids therein is formed using a positive electrode active material 11. Specifically, as shown in FIG. 5, in this embodiment, LiCoO$_2$ (lithium cobalt oxide, hereinafter referred to as "LCO") was used as the positive electrode active material 11 which is a lithium composite metal oxide containing Li and a transition metal (Co). By using a molding device 80 including a die (molding die) 81 and a pressurizing section 82, for example, 150 mg of LCO particles 11$p$ were weighed and filled in the die (molding die) 81 having a diameter of 10 mm, uniaxial pressing was performed at a pressure of 50 kgN for 2 minutes, whereby a pellet was prepared. The pellet is placed on a substrate and fired using, for example, an electric muffle furnace. The firing temperature is preferably a temperature of 850° C. or higher and lower than the melting point of the positive electrode active material 11. In this case, the LCO particles 11$p$ are used as the positive electrode active material 11, and therefore, the firing temperature is preferably 875° C. or higher and 1000° C. or lower. By doing this, as shown in FIG. 6, an integrated porous molded body (sintered body) 10$s$ is obtained by sintering the LCO particles 11$p$ to one another. By setting the firing temperature to 850° C. or higher, sintering sufficiently proceeds, and also the electron conduction property within the crystal of the LCO particle 11$p$ is ensured. By setting the firing temperature to a temperature lower than the melting point of the positive electrode active material 11, excess volatilization of lithium ions in the crystal of the LCO particle 11$p$ is suppressed, and the lithium ion conduction property is maintained. That is, the capacity of the composite body 10 can be ensured. Therefore, in the lithium ion battery 100 using the composite body 10, appropriate output and capacity can be imparted.

The pellet may be formed by including an organic material such as a binder (binding agent) for binding the LCO particle 11$p$ to one another or a pore forming material for adjusting the porosity of the molded body 10$s$, however, if such an organic material remains after firing, it affects the electrical charge conduction property, and therefore, it is preferred to reliably burn down the organic material by firing. In other words, it is desired to form the pellet without including an organic material such as a binder or a pore forming material. The porosity of the molded body 10$s$ can be controlled by adjusting the average particle diameter of the LCO particle 11$p$, that is, the positive electrode active material particles and the sintering conditions such as the pressure when forming the pellet and the firing temperature. In this embodiment, in order to achieve sufficient contact between the electrolyte to be filled thereafter and the positive electrode active material 11, the porosity of the molded body 10$s$ was adjusted to 40% or more and 60% or less.

The firing time is preferably set to, for example, 5 minutes or more and 36 hours or less, more preferably 4 hours or more and 14 hours or less. By the above-mentioned treatment, the porous molded body 10$s$ is obtained. The material of the substrate to be used in the firing is not particularly limited, however, a material which hardly reacts with the LCO particles 11$p$, for example, magnesium oxide or the like is preferably used. Then, the process proceeds to the step S2.

In the step of filling the first electrolyte 12 in the molded body 10$s$ of the step S2, the first electrolyte 12 is filled in the voids in the molded body 10$s$. Specifically, first, a precursor of the first electrolyte 12 is prepared. As the precursor, for example, any of the following (A) to (D) is used.

(A) A composition including a salt which contains metal atoms in proportions according to the formulation of the first electrolyte 12, and is converted into the first electrolyte 12 by oxidation.

(B) A composition including a metal alkoxide which contains metal atoms in proportions according to the formulation of the first electrolyte 12.

(C) A dispersion liquid in which the composition (A) or (B) is dispersed in a solvent.

(D) A dispersion liquid in which the first electrolyte 12 in the form of fine particles or a sol in the form of fine particles containing metal atoms in proportions according to the formulation of the first electrolyte 12 is dispersed in a solvent.

The salt contained in (A) includes a metal complex.

In this embodiment, as the first electrolyte 12 which exhibits a higher ion conductivity than that of the positive electrode active material 11 (LCO), $Li_{6.75}La_3Zr_{1.75}Nb_{0.25}O_{12}$ (hereinafter abbreviated and referred to as "LLZrNbO") which is a lithium composite oxide was used. The crystal particles 12p of LLZrNbO are dispersed in a solvent 51 and the resulting material is used as a precursor solution 50. The average particle diameter of LLZrNbO is, for example, from 300 nm to 1 μm. The melting point of LLZrNbO is from about 1000° C. to 1100° C.

Subsequently, the precursor solution 50 is impregnated (allowed to soak) into the voids of the molded body 10s composed of the positive electrode active material 11. Specifically, as shown in FIG. 7, for example, the precursor solution 50 is dropped from a nozzle 61 onto the molded body 10s placed on a substrate 52. Alternatively, the molded body 10s may be immersed in the precursor solution 50. In another example, the precursor solution 50 may be applied to the molded body 10s. In still another example, the precursor solution 50 may be brought into contact with an end portion of the molded body 10s so as to impregnate the precursor solution 50 into the voids of the molded body 10s by utilizing capillary phenomenon. At this time, the impregnation of the precursor solution 50 may be accelerated by pressurizing the atmosphere or the precursor solution 50 surrounding the molded body 10s. The substrate 52 is, for example, a transparent quartz substrate which is hardly deformed or the like even if drying or firing is performed at a high temperature thereafter.

Then, the molded body 10s impregnated with the precursor solution 50 is dried in the air, and then, fired by performing a heat treatment in a rare gas atmosphere. By doing this, as shown in FIG. 8, the first electrolyte 12 is deposited on the surface of the positive electrode active material 11 of the molded body 10s. That is, in the molded body 10s, the first electrolyte 12 is filled in the voids of the sintered positive electrode active material 11. Then, the process proceeds to the step S3.

Figure 9:
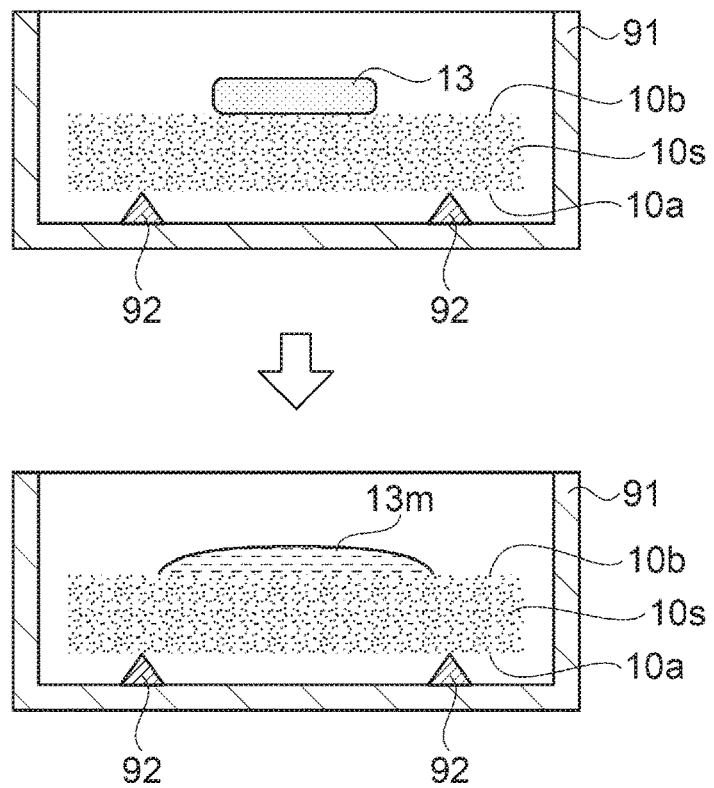
FIG. 9 is a schematic view showing a step in the method for producing the lithium battery of the first embodiment.

In the step of filling the second electrolyte 13 in the molded body 10s of the step S3, further the second electrolyte 13 is filled in the voids of the molded body 10s. Specifically, as shown in FIG. 9, first, the molded body 10s in which the first electrolyte 12 is filled is placed in a pot 91. The molded body 10s is supported by a support needle 92 provided on the bottom surface of the pot 91. The pot 91 is composed of, for example, magnesium oxide, and the support needle 92 is composed of, for example, gold (Au). On the molded body 10s, the second electrolyte 13 in a solid form is placed. In this embodiment, a surface of the molded body 10s on which the second electrolyte 13 is placed is referred to as "one surface 10b", and a surface of the molded body 10s supported by the support needle 92 is referred to as "the other surface 10a".

In this embodiment, as the second electrolyte 13, $Li_{2+x}C_{1-x}B_xO_3$ (hereinafter referred to as "LCBO") having a melting point lower than that of the first electrolyte 12 (LLZrNbO) was used. The melting point of LCBO is about 700° C., and therefore, the pot 91 was heated to about 800° C. in an atmosphere containing carbon dioxide ($CO_2$) gas to melt the second electrolyte 13 placed on the molded body 10s, whereby a melt 13m was obtained. The melt 13m is impregnated into the molded body 10s which is a porous material. Thereafter, the pot 91 is cooled to room temperature, whereby the impregnated melt 13m is solidified. By doing this, the second electrolyte 13 is further filled in the voids of the sintered positive electrode active material 11 in the molded body 10s in which the first electrolyte 12 is filled. Then, the process proceeds to the step S4.

Figure 10:
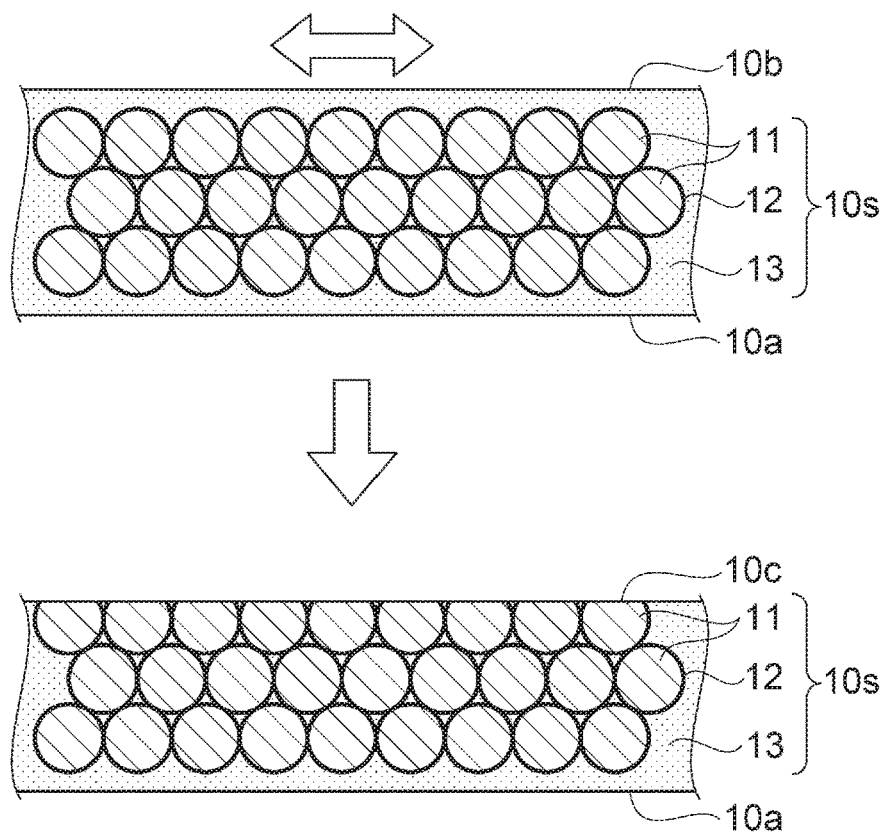
FIG. 10 is a schematic view showing a step in the method for producing the lithium battery of the first embodiment.

In the step of polishing the molded body 10s of the step S4, as shown in FIG. 10, the one surface 10b of the molded body 10s in which the first electrolyte 12 and the second electrolyte 13 are filled is polished, whereby the positive electrode active material 11 is exposed. The surface on which the positive electrode active material 11 is exposed is a polished surface and corresponds to the one surface 10c of the composite body 10 shown in FIG. 2. Hereinafter, the one surface 10c is also referred to as "polished surface 10c". Examples of a method for polishing the one surface 10b of the molded body 10s in this manner include a chemical mechanical polishing treatment (CMP treatment). The surface of the molded body 10s to be subjected to the polishing treatment is not limited to the one surface 10b and may be the other surface 10a. Then, the process proceeds to the step S5.

Figure 11:
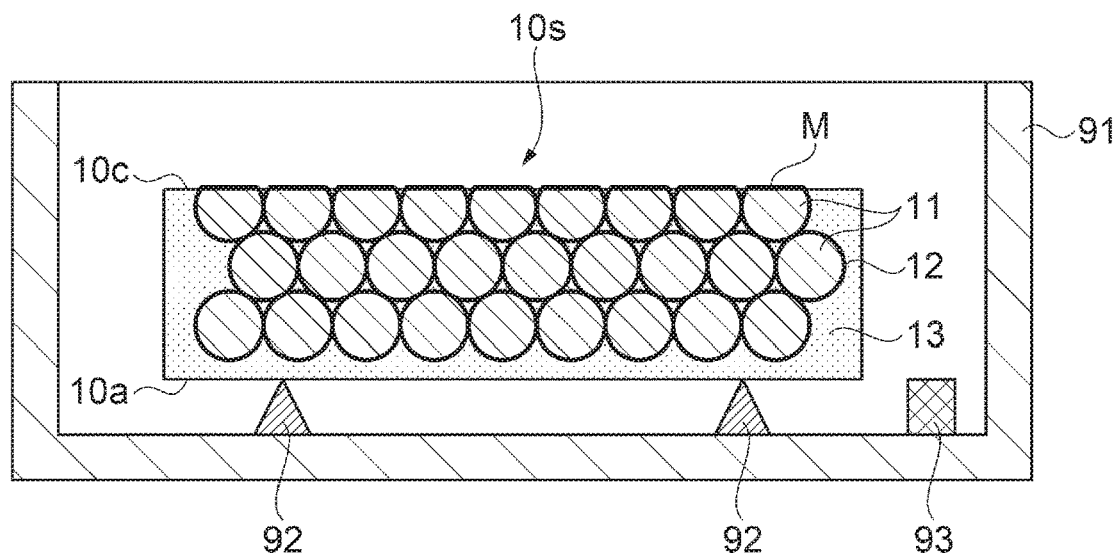
FIG. 11 is a schematic view showing a step in the method for producing the lithium battery of the first embodiment.

In the step of reducing the molded body 10s of the step S5, the positive electrode active material 11 exposed on the polished surface 10c is reduced by heating the molded body 10s in a reducing atmosphere. Specifically, as shown in FIG. 11, the polished molded body 10s is placed in the pot 91. The other surface 10a of the molded body 10s is supported by the support needle 92 in the pot 91. Further, in the pot 91, a reducing agent 93 is placed. The reducing agent 93 is, for example, carbon graphite. The reducing agent 93 is placed, and the pot 91 is left in a state of being heated to about 800° C. or higher and 1000° C. or lower in a reducing atmosphere containing argon (Ar) gas as an inert gas for 30 minutes or more and 8 hours or less, and then, cooled to room temperature. By doing this, the positive electrode active material 11 exposed on the polished surface 10c is subjected to the reduction treatment, whereby the transition metal M contained in the lithium composite metal oxide constituting the positive electrode active material 11 is reduced from the oxidized state and exposed. In this embodiment, LCO is used as the positive electrode active material 11, and therefore, Co is exposed as the transition metal M on the polished surface 10c. At this stage, the composite body 10 is completed. The inert gas contained in the reducing atmosphere is not limited to argon gas and may be nitrogen ($N_2$) gas. Then, the process proceeds to the step S6.

Figure 12:
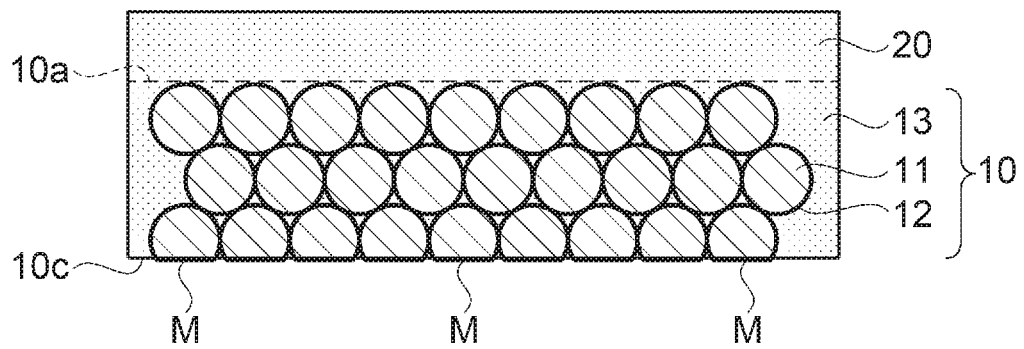
FIG. 12 is a schematic view showing a step in the method for producing the lithium battery of the first embodiment.

In the step of forming the electrolyte layer 20 of the step S6, as shown in FIG. 12, the electrolyte layer 20 is formed on the other surface 10a which is the surface on the opposite side to the polished surface 10c of the composite body 10. In this embodiment, LCBO which is the same as the second electrolyte 13 was deposited by a sputtering method, whereby the electrolyte layer 20 was formed. The thickness of the electrolyte layer 20 is 0.1 μm or more and 100 μm or less. Then, the process proceeds to the step S7.

Figure 13:
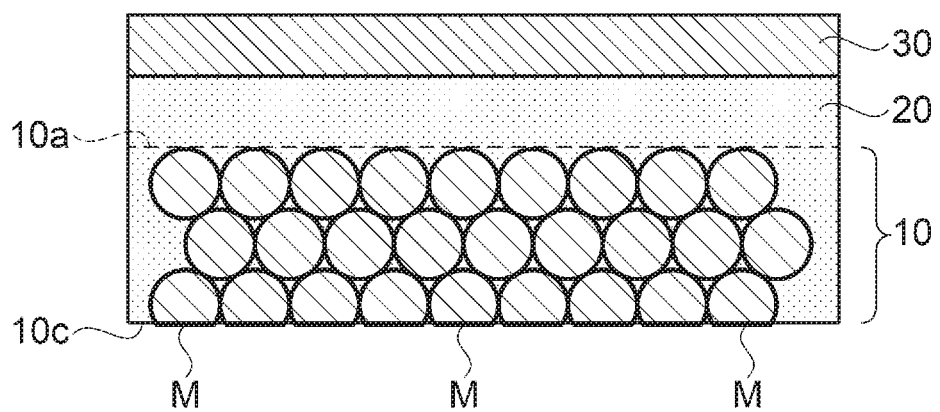
FIG. 13 is a schematic view showing a step in the method for producing the lithium battery of the first embodiment.

In the step of forming the negative electrode layer 30 of the step S7, as shown in FIG. 13, the negative electrode layer 30 is formed by being stacked on the electrolyte layer 20. In this embodiment, metal Li was deposited on the electrolyte layer 20 by a sputtering method, whereby the negative electrode layer 30 was formed. The thickness of the negative electrode layer 30 is 50 nm or more and 100 μm or less. Then, the process proceeds to the step S8.

In the step of forming the current collectors 41 and 42 of the step S8, as shown in FIG. 2, the current collector 41 was formed in contact with the one surface (polished surface) 10c of the composite body 10, and the current collector 42 was formed in contact with the negative electrode layer 30. In this embodiment, the current collectors 41 and 42 were formed by adhering a copper foil having a thickness of about 20 µm, followed by pressure bonding. By doing this, the lithium battery 100 is completed.

Figure 14:
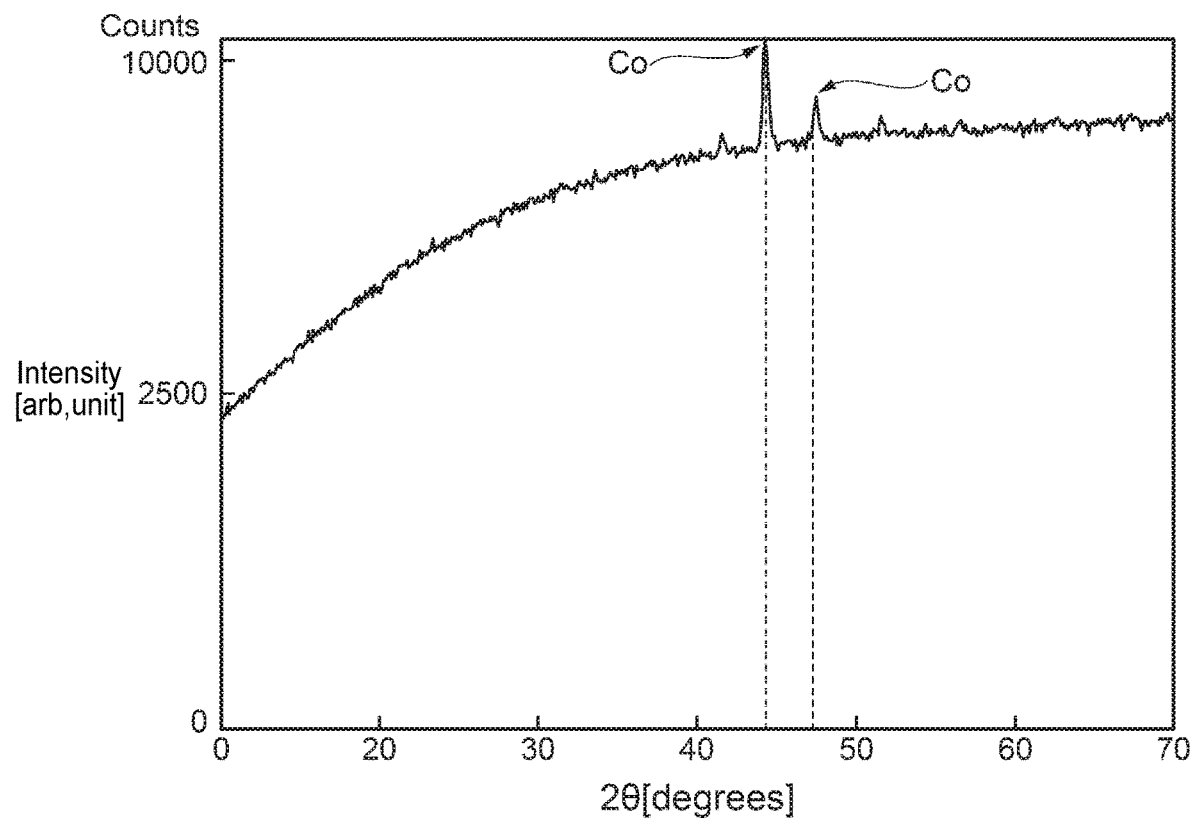
FIG. 14 is a graph showing X-ray intensity peaks by X-ray diffraction on one surface of the composite body.
Figure 15:
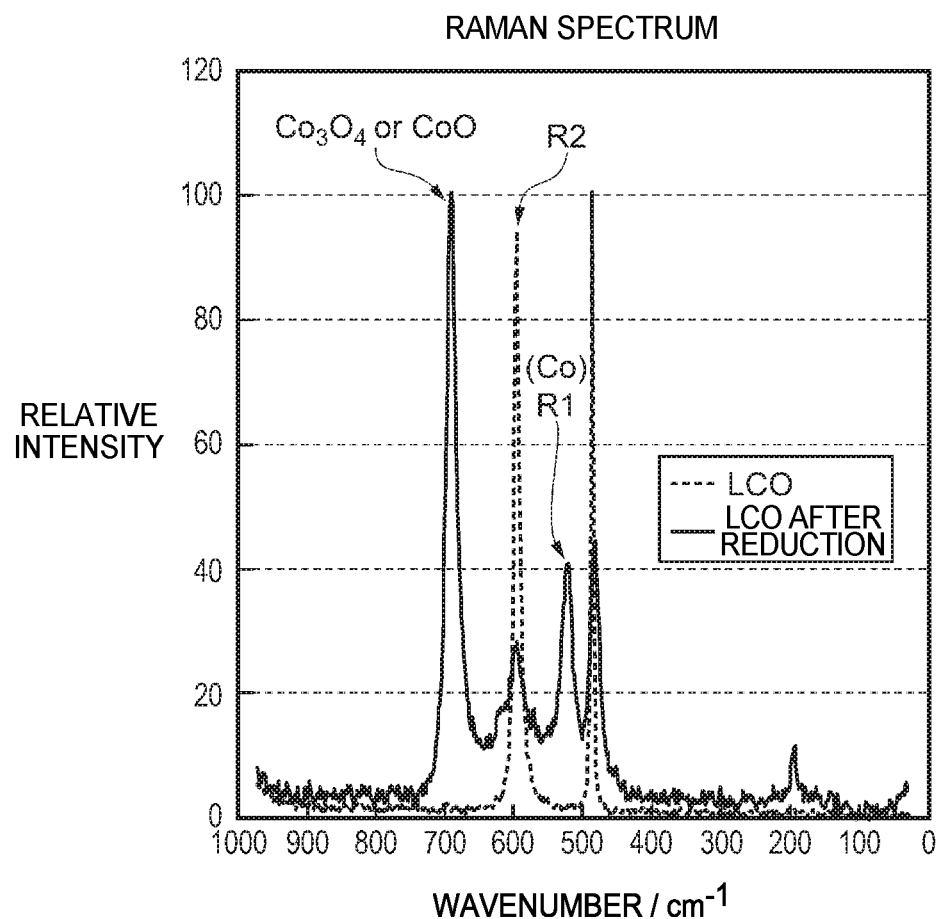
FIG. 15 is a graph showing a Raman spectrum on one surface of the composite body.

When the step S5 was completed, the state of the one surface (polished surface) 10c of the composite body 10 was confirmed using X-ray diffractometry (XRD) and microscopic Raman spectroscopy. FIG. 14 is a graph showing X-ray intensity peaks by X-ray diffraction on the one surface of the composite body, and FIG. 15 is a graph showing a Raman spectrum on the one surface of the composite body. The state of the one surface 10c before performing the reduction treatment is also confirmed using microscopic Raman spectroscopy.

As shown in FIG. 14, according to X-ray diffractometry (XRD), X-ray diffraction peaks derived from Co were obtained when 2θ was in the following ranges: $43°<2θ<45°$ and $47°<2θ<48°$. That is, the existence of Co which is the transition metal contained in the positive electrode active material 11 on the one surface 10c of the composite body 10 obtained after the reduction treatment was confirmed.

Further, as shown in FIG. 15, according to microscopic Raman spectroscopy, peaks R2 of lithium cobalt oxide (LCO) are observed in the range of 480 $cm^{-1}$ to 500 $cm^{-1}$ and in the range of 590 $cm^{-1}$ to 610 $cm^{-1}$ on the one surface 10c before the reduction treatment. On the other hand, on the one surface 10c after the reduction treatment, in addition to the above-mentioned peaks before the reduction treatment, a peak R1 derived from Co or Co oxides is observed in the range of 510 $cm^{-1}$ to 530 $cm^{-1}$. Further, a peak derived from $Co_3O_4$ or CoO is observed in the range of 660 $cm^{-1}$ to 710 $cm^{-1}$.

According to FIG. 15, a relationship between the intensity of the peak R1 derived from Co or Co oxides appearing in the range of 510 $cm^{-1}$ to 530 $cm^{-1}$ and the intensity of the peak R2 of lithium cobalt oxide (LCO) appearing in the range of 590 $cm^{-1}$ to 610 $cm^{-1}$ is as follows: R1≥R2. That is, also by the microscopic Raman spectroscopy, the existence of Co which is the transition metal contained in the positive electrode active material 11 on the one surface 10c of the composite body 10 obtained after the reduction treatment was confirmed. In addition, the existence of $Co_3O_4$ or CoO which is a product generated by the reduction treatment was confirmed. The compositional ratio (molar ratio) of lithium cobalt oxide (LCO) is as follows: Li:Co:O=1:1:2, however, when the reduction reaction is performed, the ratio changes from Co:O=1:2 to Co:O=3:4≈1:1.3, and when reduction further proceeds, the ratio changes to Co:O=1:1, and becomes Co:O=1:0 in the end. That is, when the reduction reaction of oxidized Co proceeds, the ratio of oxygen O relative to Co decreases. In the actual reduction reaction, as described above, $Co_3O_4$, CoO, and metal Co coexist. Therefore, when the molar ratio between Co and oxygen (O) on the one surface 10c of the composite body 10 reaches Co≥O, this indicates that reduced metal Co reliably exists on the one surface 10c, and the number of reduced Co atoms is larger than the number of Co atoms constituting LCO on the one surface 10c.

According to the composite body 10, the lithium battery 100 to which the composite body 10 is applied, and the method for producing the lithium battery 100 (including the method for producing the composite body 10) of the above-mentioned embodiment, the following effects are obtained.

(1) The composite body 10 includes the positive electrode active material 11 composed of a lithium composite metal oxide containing Li and at least one type of transition metal, the first electrolyte 12, and the second electrolyte 13, the positive electrode active material 11 is exposed on the one surface 10c of the composite body 10, and the transition metal of the positive electrode active material 11 exposed on the one surface 10c is reduced. According to this configuration, the transition metal contained in the positive electrode active material 11 is partially exposed in a non-oxidized state on the one surface 10c of the composite body 10, and therefore, by forming the current collector 41 on the one surface 10c, the current collector 41 and the reduced transition metal come into contact with each other, and thus, the composite body 10 capable of reducing the internal resistance of the lithium battery 100 can be provided. That is, by using such a composite body 10, the lithium battery 100 having excellent battery characteristics (charge and discharge characteristics) can be provided.

(2) The positive electrode active material 11 contains Co selected from Ti, V, Cr, Mn, Fe, Co, Ni, and Cu as the transition metal. Co is a transition metal which is more easily reduced than Li, and LCO which is the positive electrode active material 11 containing Co is chemically stable, and therefore is preferred as a substance constituting the positive electrode of the lithium battery 100.

(3) The positive electrode active material 11 has a particulate shape and forms the molded body 10s having a circular disk shape as a structure having voids therein. The first electrolyte 12 composed of LLZrNbO and the second electrolyte 13 composed of LCBO having a melting point lower than that of the first electrolyte 12, each of which is filled in the voids in the sintered molded body 10s, are included. According to this configuration, the contact area between the positive electrode active material 11 and the electrolyte is increased, and the composite body 10 capable of realizing excellent charge and discharge characteristics when it is used in the lithium battery 100 can be provided. Further, the second electrolyte 13 is a lithium composite oxide (LCBO) containing C (carbon) and B (boron), and therefore, the lithium composite oxide (LCBO) is likely to become amorphous, and as compared with the case where the second electrolyte 13 is crystalline, the second electrolyte 13 does not exhibit anisotropy in lithium ion conduction, and thus, an excellent ion conduction property of the composite body 10 can be realized.

(4) The method for producing the composite body 10 includes a step of forming the molded body 10s which is a structure having voids therein using the positive electrode active material 11 composed of a lithium composite metal oxide containing Li and at least one type of transition metal (step S1), steps of filling the first electrolyte 12 and the second electrolyte 13 in the voids of the molded body 10s (step S2 and step S3), a step of exposing the positive electrode active material 11 on the polished surface 10c by polishing the one surface 10b of the molded body 10s in which the electrolyte is filled (step S4), and a step of reducing the molded body 10s by subjecting the molded body 10s to a heating treatment in a reducing atmosphere in which the reducing agent 93 is placed and an inert gas is contained (step S5). According to this method, by subjecting the molded body 10s in which the positive electrode active material 11 exposed on the polished surface 10c to the reduction treatment, the oxidized transition metal (Co) contained in the positive electrode active material 11 can be partially reduced and exposed on the polished surface 10c. Further, the molar ratio between the transition metal (Co) and oxygen (O) in the positive electrode active material 11 (LCO) exposed on the one surface (polished surface) 10c after subjecting the molded body 10s to a reduction treatment satisfies the following relationship: Co≥O, and therefore, the non-oxidized transition metal (Co) exists more on the one surface (polished surface) 10c. Therefore, by forming the current collector 41 on the one surface (polished surface) 10c, the current collector 41 and the non-oxidized transition metal (Co) come into contact with each other, and thus, the composite body 10 capable of reducing the internal resistance of the lithium battery 100 can be produced. That is, by including the polishing step of the step S4 and the reduction step of the step S5, the transition metal which contributes to the reduction of the internal resistance of the lithium battery 100 can be easily made to exist at the interface between the positive electrode active material 11 and the current collector 41.

(5) The method for producing the lithium battery 100 includes a step of forming the electrolyte layer 20 on the other surface 10a of the composite body 10 obtained by the method for producing the composite body 10 (step S6), a step of forming the negative electrode layer 30 composed of metal Li on the electrolyte layer 20 (step S7), and a step of forming the current collector 41 on the one surface (polished surface) 10c, which is on the opposite side to the other surface 10a, and on which the transition metal (Co) is exposed. According to this method, the electrical resistance at the connection between the composite body 10 and the current collector 41 can be reduced, and therefore, the lithium battery 100 having a low internal resistance and excellent charge and discharge characteristics can be produced.

Further, by using metal Li as the negative electrode layer 30, excellent discharge capacity can be realized as compared with the case where other electrode materials are used. In addition, by forming the electrolyte layer 20 between the molded body 10s which is a structure and the negative electrode layer 30 composed of metal Li, an electrical short circuit associated with the formation of a metal Li dendrite during charge and discharge can be prevented by the electrolyte layer 20. That is, the lithium battery 100 having high reliability and quality can be produced.

Second Embodiment

Electronic Apparatus

Figure 16:
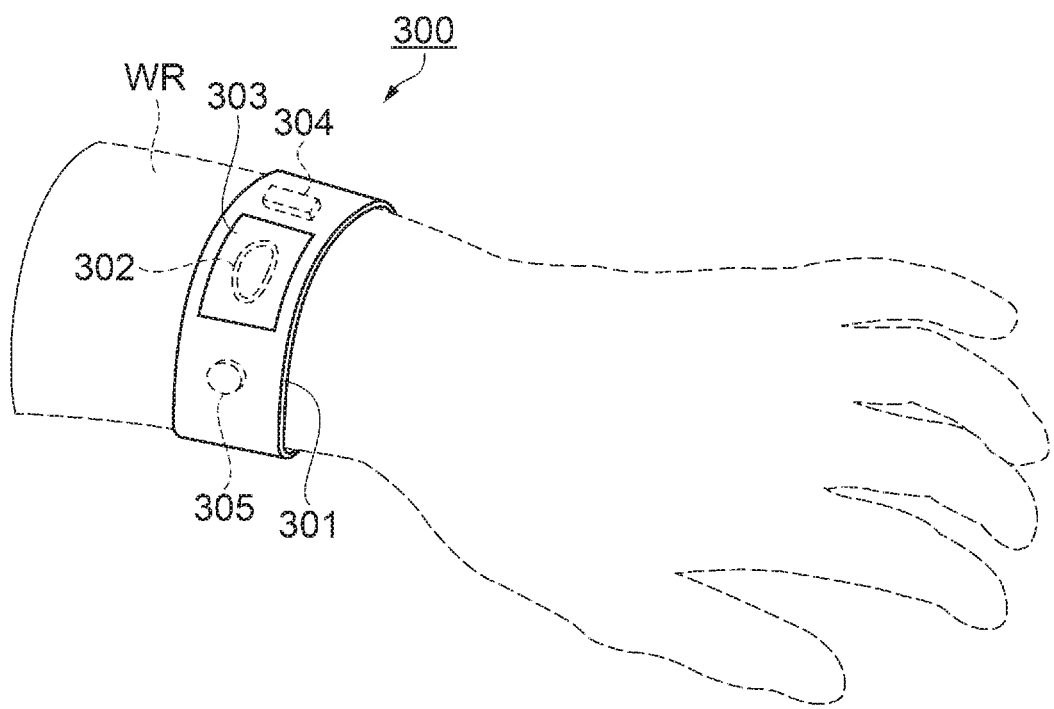
FIG. 16 is a perspective view showing a structure of a wearable apparatus as an electronic apparatus of a second embodiment.

Next, a wearable apparatus will be described as an example of an electronic apparatus of this embodiment. FIG. 16 is a perspective view showing a structure of a wearable apparatus as an electronic apparatus of a second embodiment.

As shown in FIG. 16, a wearable apparatus 300 as the electronic apparatus of this embodiment is an information apparatus which is worn on, for example, the wrist WR of the human body like a watch and can obtain information related to the human body, and includes, a band 301, a sensor 302, a display section 303, a processing section 304, and a battery 305.

The band 301 is formed in a belt shape using a resin having flexibility, for example, rubber or the like so as to come into close contact with the wrist WR when it is worn, and has a binding section capable of adjusting the binding position in an end portion of the band.

The sensor 302 is, for example, an optical sensor, and is disposed on the inner surface side (the wrist WR side) of the band 301 so as to come into contact with the wrist WR when it is worn.

The display section 303 is, for example, a light-receiving type liquid crystal display device, and is disposed on the outer surface side (a side opposite to the inner surface on which the sensor 302 is attached) of the band 301 so that a wearer can read the information displayed on the display section 303.

The processing section 304 is, for example, an integrated circuit (IC), and is incorporated in the band 301 and is electrically connected to the sensor 302 and the display section 303. The processing section 304 performs arithmetic processing for measuring the pulse rate, the blood glucose level, or the like based on the output from the sensor 302. In addition, the processing section 304 controls the display section 303 so as to display the measurement results or the like.

The battery 305 is incorporated in the band 301 in an attachable and detachable state as a power supply source which supplies power to the sensor 302, the display section 303, the processing section 304, etc. As the battery 305, the lithium battery 100 of the above-mentioned first embodiment is used.

According to the wearable apparatus 300 of this embodiment, by the sensor 302, information or the like associated with the pulse rate or the blood glucose level of a wearer is electrically detected from the wrist WR, and the pulse rate, the blood glucose level, or the like can be displayed on the display section 303 through the arithmetic processing or the like by the processing section 304. On the display section 303, not only the measurement results, but also, for example, information indicating the conditions of the human body predicted from the measurement results, time, etc. can be displayed.

Since the lithium battery 100 which is small but has excellent charge and discharge characteristics is used as the battery 305, the wearable apparatus 300 which is lightweight and thin and can withstand long-term repetitive use can be provided. Further, the lithium battery 100 is an all-solid-state secondary battery, and therefore can be repetitively used by charging, and also there is no concern about leakage of the electrolytic solution or the like, and therefore, the wearable apparatus 300 which can be used safely over a long period of time can be provided.

In this embodiment, the wearable apparatus 300 of watch type is shown as an example, however, the wearable apparatus 300 may be a wearable apparatus to be worn on, for example, the ankle, head, ear, waist, or the like.

The electronic apparatus to which the lithium battery 100 is applied as the power supply source is not limited to the wearable apparatus 300. For example, a head-mounted display, a head-up display, a portable telephone, a portable information terminal, a notebook personal computer, a digital camera, a video camera, a music player, a wireless headphone, a gaming machine, and the like can be exemplified. Further, the lithium battery 100 can be applied not only to such consumer apparatuses (apparatuses for general consumers), but also to apparatuses for industrial use. In addition, the electronic apparatuses according to the invention may have another function, for example, a data communication function, a gaming function, a recording and playback function, a dictionary function, or the like.

The invention is not limited to the above-mentioned embodiments, and appropriate modifications are possible without departing from the gist or idea of the invention readable from the appended claims and the entire specification, and a composite body thus modified, a method for producing the same, a lithium battery to which the composite body is applied, a method for producing the same, and an electronic apparatus to which the lithium battery is applied are also included in the technical scope of the invention. Other than the above-mentioned embodiments, various modification examples can be contemplated. Hereinafter, modification examples will be described.

Modification Example 1

The transition metal contained in the positive electrode active material 11 of the composite body 10 is not limited to one type selected from Ti, V, Cr, Mn, Fe, Co, Ni, and Cu, and may be two or more types. In other words, the composite body 10 may be in a state where two or more types of transition metals are exposed on the one surface 10c of the composite body 10 on which the current collector 41 on the positive electrode side is provided. According to this configuration, the internal resistance of the lithium battery 100 can be further reduced.

Modification Example 2

The composite body 10 is not limited to those configured to include the positive electrode active material 11, the first electrolyte 12, and the second electrolyte 13. For example, the composite body 10 may be configured to include the positive electrode active material 11 and the first electrolyte 12 which is crystalline, or may be configured to include the positive electrode active material 11 and the second electrolyte 13 which is amorphous. Moreover, the composite body 10 may be configured to include an electrolyte other than the first electrolyte 12 and the second electrolyte 13 or include a conductive assistant.

Modification Example 3

In the method for producing the composite body 10, the method for filling the electrolyte in the molded body 10s of the positive electrode active material 11 is not limited to a liquid-phase method. For example, the molded body 10s may be formed by molding a slurry obtained by mixing the positive electrode active material 11 having a particulate shape, an electrolyte having a particulate shape likewise, and a solvent through pressurization, and firing the molded material through heating.

The entire disclosure of Japanese Patent Application No. 2017-157436, filed Aug. 17, 2017 is expressly incorporated by reference herein.

What is claimed is:

1. A composite body, comprising:
a positive electrode active material consisting of a lithium composite metal oxide having Li and at least one type of transition metal; and
an electrolyte,
wherein the positive electrode active material is present on one surface of the composite body, the one type of transition metal is Co, and a number of non-oxidized Co atoms on the one surface of the composite body is larger than a number of Co atoms constituting lithium cobalt oxide on the one surface of the composite body.

2. The composite body according to claim 1, wherein the positive electrode active material has a particulate shape and forms a structure having void therein, and the electrolyte includes a first electrolyte and a second electrolyte having a melting point lower than that of the first electrolyte, each of which is filled in the void.

3. The composite body according to claim 2, wherein the second electrolyte is a lithium composite oxide containing C and B.

4. The composite body according to claim 1, wherein X-ray diffraction peaks derived from Co are obtained when 2θ is in the following ranges: 43°<2θ<45° and 47°<2θ<48° in X-ray diffractometry of the one surface.

5. The composite body according to claim 4, wherein the positive electrode active material has a particulate shape and forms a structure having void therein, and the electrolyte includes a first electrolyte and a second electrolyte having a melting point lower than that of the first electrolyte, each of which is filled in the void.

6. The composite body according to claim 5, wherein the second electrolyte is a lithium composite oxide containing C and B.

7. The composite body according to claim 1, wherein a relationship between an intensity of a peak R1 derived from Co or Co oxides appearing in the range of 510 $cm^{-1}$ to 530 $cm^{-1}$ and an intensity of a peak R2 of the lithium cobalt oxide appearing in the range of 590 $cm^{-1}$ to 610 $cm^{-1}$ in Raman spectroscopy of the one surface is as follows: R1>R2.

8. The composite body according to claim 7, wherein the positive electrode active material has a particulate shape and forms a structure having void therein, and the electrolyte includes a first electrolyte and a second electrolyte having a melting point lower than that of the first electrolyte, each of which is filled in the void.

9. The composite body according to claim 8, wherein the second electrolyte is a lithium composite oxide containing C and B.

10. A lithium battery, comprising:
the composite body according to claim 1;
a current collector provided on one surface side of the composite body; and
a negative electrode layer provided on another surface side of the composite body.

11. An electronic apparatus, comprising the lithium battery according to claim 10.

12. A lithium battery, comprising:
the composite body according to claim 6;
a current collector provided on one surface side of the composite body; and
a negative electrode layer provided on another surface side of the composite body.

13. An electronic apparatus, comprising the lithium battery according to claim 12.

14. A lithium battery, comprising:
the composite body according to claim 9;
a current collector provided on one surface side of the composite body; and
a negative electrode layer provided on another surface side of the composite body.

15. An electronic apparatus, comprising the lithium battery according to claim 14.

* * * * *